United States Patent [19] [11] 4,353,581
Eisenzimmer [45] Oct. 12, 1982

[54] HOSE COUPLING

[75] Inventor: George W. Eisenzimmer, Akron, Ohio

[73] Assignee: The Goodyear Tire & Rubber Company, Akron, Ohio

[21] Appl. No.: 210,944

[22] Filed: Nov. 28, 1980

[51] Int. Cl.³ .............................................. F16L 39/02
[52] U.S. Cl. .................... 285/149; 285/238; 285/292; 285/DIG. 16; 285/328
[58] Field of Search .............. 285/149, 256, 259, 292, 285/328, 39, 238, DIG. 16; 138/130

[56] References Cited

U.S. PATENT DOCUMENTS

| 1,801,403 | 4/1931 | White . | |
|---|---|---|---|
| 2,228,018 | 1/1941 | Scholtes . | |
| 2,234,350 | 3/1941 | Muller . | |
| 2,277,397 | 3/1942 | Graham . | |
| 2,278,239 | 3/1942 | Butler . | |
| 2,428,189 | 9/1947 | Wolfram . | |
| 2,473,441 | 6/1949 | Muller | 285/149 |
| 2,506,494 | 5/1950 | Feiler et al. . | |
| 2,517,606 | 8/1950 | Spender . | |
| 2,661,225 | 12/1953 | Lyon . | |
| 2,809,056 | 10/1957 | Kaiser . | |
| 2,825,364 | 3/1958 | Cullen et al. . | |
| 2,920,910 | 1/1960 | Schnabel | 285/149 |
| 2,940,778 | 6/1960 | Kaiser . | |
| 3,237,974 | 3/1966 | Press . | |
| 3,347,571 | 10/1967 | New . | |
| 3,525,542 | 8/1970 | Belart et al. | 285/256 |
| 3,529,853 | 9/1970 | Triest et al. . | |
| 3,531,143 | 9/1970 | Horvath et al. | 285/149 |
| 3,566,924 | 3/1971 | Ambrus et al. | 138/130 |
| 3,729,028 | 4/1973 | Horvath et al. | 138/130 |
| 4,033,612 | 7/1977 | Chevalier | 285/149 |
| 4,093,280 | 6/1978 | Yoshizawa et al. | 285/39 |
| 4,143,892 | 3/1979 | Murphy et al. | 285/149 |

OTHER PUBLICATIONS

Gates Rubber Co. Publication 33698-B, 4/1978.

Primary Examiner—Dave W. Arola
Attorney, Agent, or Firm—D. M. Ronyak

[57] ABSTRACT

A coupling, a reinforced hose and coupling assembly and a method of making such an assembly is disclosed. The coupling includes an internal recess which in the assembly is filled with elastomeric material to provide a fluid tight seal between the hose and the coupling.

10 Claims, 6 Drawing Figures

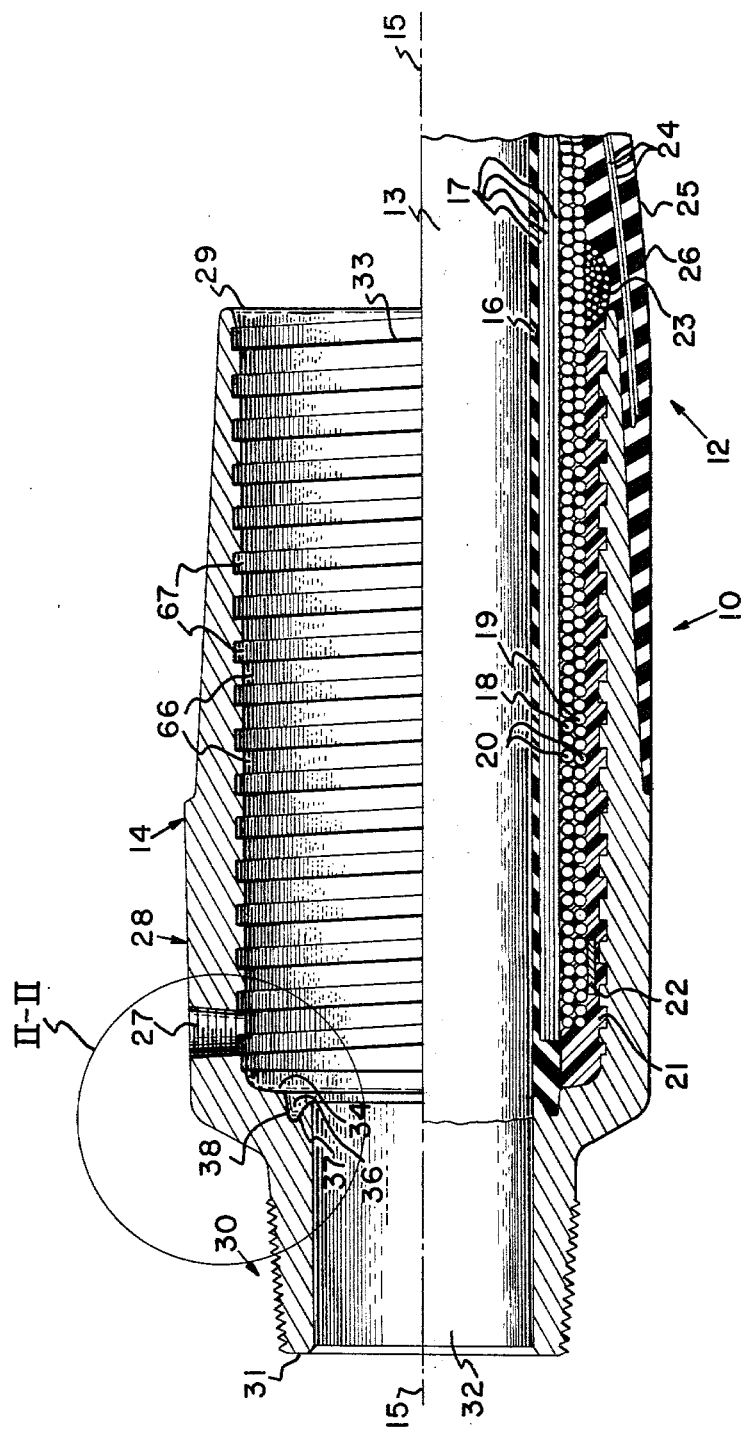
FIG. I

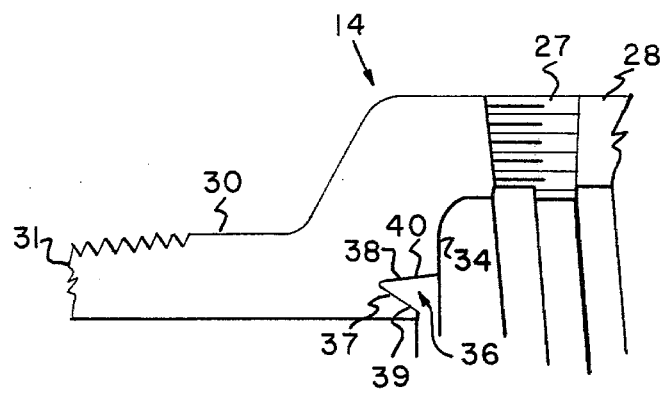
FIG. II
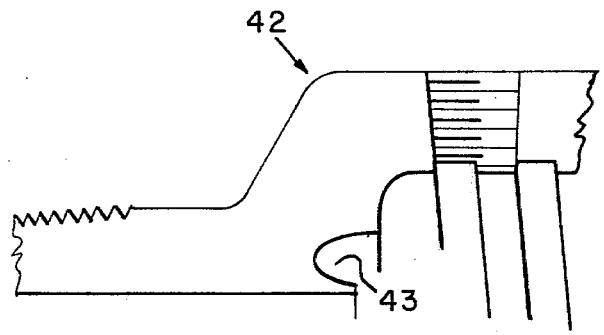
FIG. III
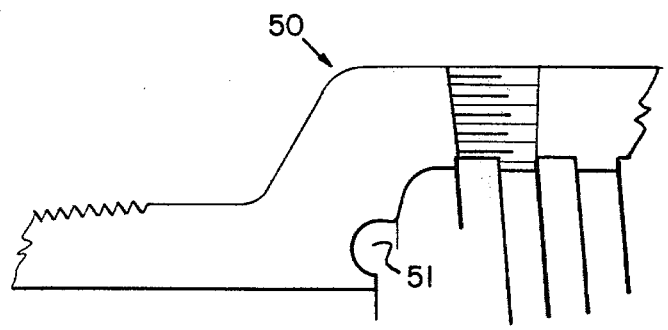
FIG. IV

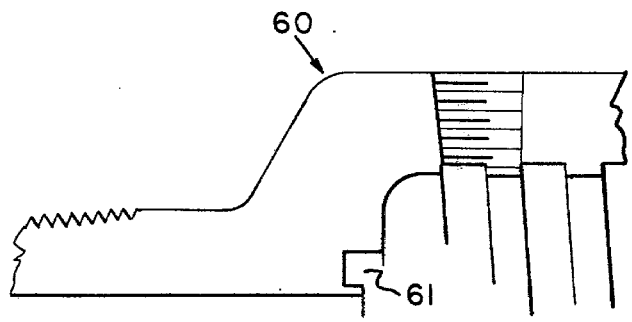
FIG. V
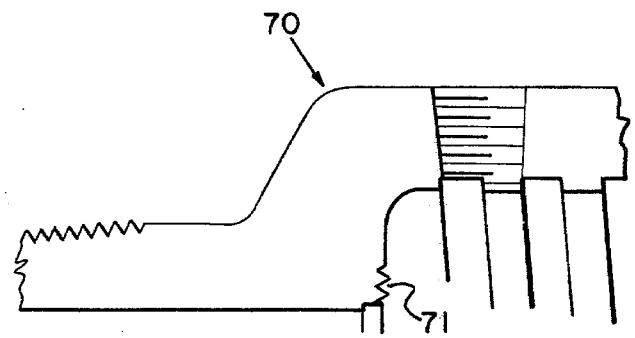
FIG. VI

HOSE COUPLING

The specification is not to be taken as limiting the invention of this application and in order to understand the full nature and extent of the technical disclosure of this application reference must be made to the accompanying drawing and to the following detailed description.

This invention relates to a coupling, a hose and coupling assembly and to a method of forming the same, and particularly relates to the coupling of heavy-duty hose having multiple plies of reinforcing elements.

Hose and coupling assemblies intended for heavy-duty hose, for example, rotary drill, choke and kill, and motion compensator hose require reliability of sealing between the hose and the coupling due to the considerable working pressures encountered which may reach or exceed 20,000 pounds per square inch. It is also desired to reduce the overall length, diameter and weight of a coupling as far as possible without compromising the reliability and working and burst pressure capability of the coupled hose and, of course, to reduce the complexity of the hose and coupling assembly and the method of manufacture of such an assembly.

The invention will be more particularly described as to its prefered embodiments by reference to the accompanying drawing in which FIG. I is a partial cut-away sectional view axially through a hose and coupling embodying the invention;

FIG. II is an enlargement of the area encircled by Line II—II in FIG. I;

FIG. III is a view similar to FIG. II illustrating a different embodiment according to the invention; and FIG. IV is a view similar to FIG. II illustrating yet another embodiment according to the invention;

FIG. V is a view similar to FIG. II illustrating still another embodiment according to the invention; and FIG. VI is a view similar to FIG. II illustrating a further embodiment according to the invention.

Referring to FIG. I there is shown a hose and coupling assembly generally at 10 having a longitudinal axis as depicted by Line 15—15. The hose 12 includes an elastomeric tube 16 which forms its radially innermost surface 13. Overlying the tube 16 may be multiple plies 17 of textile reinforcement embedded in elastomeric material. Overlying the tube 16 and textile plies 17 are at least two plies 18,19 of main reinforcing elements such as steel cables 20 or wires. Typically, each of the steel cables 20 is comprised of a plurality of filaments of high tensile steel wire. The cables 20 are helically wound about the tube 16 and textile reinforcement plies 17, the cables 20 of the radially inner-most ply 18 being of opposite sense direction relative to those of the adjacent radially outermost ply 19 of steel cables. Overlying the steel cables 20 may be one or more layers of outer fabric plies 24 which are embedded in elastomeric material. Overlying the outer fabric plies 24 is a cover layer 25 of elastomeric material which forms the outer surface 26 of the hose 12.

The coupling 14 includes a nipple portion 30 having a nipple end 31. The nipple portion 30 is joined to a sleeve portion 28 and in a preferred embodiment is unitary therewith and machined from a single piece of steel. The sleeve portion 28 of the coupling 14 includes hose end 29 which in a preferred embodiment of the completed assembly is covered by the outer cover layer 25 of the hose 12.

The nipple portion 30 of coupling 14 includes a bore 32 therethrough and coaxial therewith. Nipple bore 32 is in communication with a counterbore 33 which extends through the sleeve portion 28 coaxially therewith. Counterbore 33 is of greater diameter than bore 32. The diameter of counterbore 33 must be at least that of the combined innertube 16, inner textile reinforcing plies 17 and steel cables 20.

Coupling 14 additionally includes an annular recess 36 which extends toward the nipple portion 30 beyond the shoulder 34 which defines the maximum extent of the counterbore 33 of the sleeve portion 28. As shown in FIGS. I and II, in a preferred embodiment recess 36 is defined in major part by a radially innermost conical surface 37 one end of which extends to the bore 32 of the nipple portion 30 and by a radially outermost annular surface 38 one end of which extends to the counterbore 33 of the sleeve portion 28 and terminates at the shoulder 34. The radially innermost conical surface 37 is generated by rotation of generator line 39 which forms an angle of about 30 degrees relative to the axial direction of the hose or coupling. As used herein the term axial and related terms mean in the direction of or parallel to the longitudinal axis 15—15 of the hose or coupling. The radially outermost annular surface 38 is also conical as depicted in FIGS. 1 and 2. A generator line 40 of the radially outermost conical surface 38 forms an angle of about 5 degrees relative to the axial direction of the coupling. In preferred embodiments similar to FIGS. I and II, the radially innermost surface 37 is generated by a line which forms an angle of about 20 to 35 degrees relative to the axial direction of the coupling, and the radially outermost surface 38 of the recess 36 is generated by a line which forms an angle of about 0 to 10 degrees relative to the axial direction of the coupling, and the included angle between the radially inner and outer surface generation lines is from about 30 to 40 degrees. It is believed however, that the included angle between the radially inner and outer surface generation lines may be as large as 60 degrees.

FIGS. III through VI illustrate alternate embodiments of the recess. As shown in FIG. III the coupling 42 includes a recess 43 which in an axial quarter section has a configuration resembling half of an elipse, the major axis of the elipse being parallel to the longitudinal axis of the coupling. Referring to FIG. IV, the coupling 50 includes a recess 51 which when viewed in an axial quarter section of the coupling has a configuration resembling that of a semicircle. It is believed that other configurations could also be successfully employed including a recess whose radially innermost and outermost surfaces do not converge at the end of the recess nearest the nipple end of the coupling. In this regard refer to FIG. V in which coupling 60 includes recess 61 which when viewed in an axial quarter section of the coupling has a configuration resembling a flat-bottomed U. Also in this regard refer to FIG. VI in which coupling 70 includes recess 71 which when viewed in an axial quarter section of the coupling has a sawtooth configuration.

Referring again to FIGS. I and II it is seen that the elastomeric material of the tube 16 extends into and fills the recess 36. In a preferred embodiment the elastomer material within the recess is of the same composition as that of the hose tube 16 and the walls 37,38 defining the recess 36 are treated to promote adhesion of the elastomer material to the walls defining the recess.

The hose and coupling assembly 10 also includes an anchoring matrix 21 in which the steel cables 20 are embedded. A preferred anchoring material is an epoxy resin. The sleeve portion 28 of the coupling 14 preferably has a configured counterbore 33 which, for example, includes a plurality of lands 66 and grooves 67 to provide secure anchorage of the coupling to the epoxy matrix. The counterbore 33 may be textured or provided with a rectangular bottom continuous spiral thread as shown in FIG. I to promote retention of the coupling 14 to the anchoring matrix 21.

A hose and coupling assembly 10 according to this invention may be made as follows: An uncured hose preform is fabricated on a cylindrical mandrel (not illustrated). The preform includes an inner layer of uncured elastomer which will become the tube 16 of the completed hose 12, rubberized fabric reinforcing plies 17 wrapped about the uncured tube and at least two plies 18,19 of main reinforcing elements such as steel cables 20. The steel cables 20 are bound at an end of the hose structure, for example, by a cable hold-down strip 22. The cables 20 and inner reinforcing plies 17 are trimmed so that about 9 mm (⅜ inch) of the uncured elastomeric tube of the hose preform extends beyond the cables 20. The cables 20 adjacent the end of the hose preform are free of any elastomeric material between or overlying them. Coupling 14 is cleaned such as by bead blasting or sand blasting and the walls 37,38 defining the recess 36 are treated to promote adhesion to the elastomeric material. Suitable adhesives for this purpose include Chemlock TM 205 and 220 in combination. These are available from Hughson Chemical Corporation. The cleaned and adhesive treated recess 36 of the coupling 14 if filled with uncured elastomeric material. This is best done in a separate operation by means of an appropriate fixture and an annular blank of uncured elastomeric material which is forced into recess 36. The elastomeric material is preferably of the same composition as that of the uncured preform tube. Coupling 14 including uncured elastomeric material in recess 36 is then brought to the hose preform. The uncured hose preform is inserted into the coupling 10. Coupling 10 and the uncured hose preform are axially forced together while uncured to unite the uncured elastomer which was previously positioned in recess 36 with the uncured elastomer of the tube of the uncured hose preform. The hose end 29 of the sleeve portion 28 of the coupling 14 is then wrapped with a sealing tape 23 thus defining a void area in conjunction with the inner surface of the sleeve portion of the coupling and the hose preform. Thereafter the uncured liquid epoxy resin is introduced through port 27 into the space between the inner wall of the sleeve portion 28 of the coupling 14 and the tube and any inner fabric reinforcing plies 17. The epoxy resin surrounds and embeds the steel cables 20 and totally fills the void area of the sleeve portion 28 of the coupling 14. The epoxy resin anchoring material surrounds the steel cables 20 and anchors them to the sleeve portion 28 of the coupling 14. Thereafter the outer cable gum layer is wrapped over the radially outermost ply 19 of main reinforcing elements. Over the outer cable gum layer are applied the outer fabric plies 24 which are followed by a layer of uncured elastomeric material which will become cover layer 25 of the hose and coupling assembly 10. The outer fabric plies 24 and the cover layer 25 extend partly over the sleeve portion 28 of the coupling 14 thus providing a smooth transition in diameter of the assembly so that snagging of the assembly when placed in service is minimized or eliminated. After completion of assembly of the uncured hose and curing of the epoxy anchoring material, the uncured hose is wrapped with cure tape and cured conventionally.

While certain representative embodiments and details have been shown for the purpose of illustrating the invention it will be apparent to those skilled in the art that various changes and modifications may be made therein without departing from the spirit or scope of the invention.

I claim:

1. In combination, a reinforced hose and coupling assembly comprising:
   (a) a hose including a radially innermost tube of elastomeric material, at least two plies of reinforcing elements, and a cover layer of polymeric material;
   (b) a rigid coupling having a nipple portion joined to a sleeve portion that extends over the hose, said nipple portion having a coaxial bore therethrough in communication with a counterbore of greater dimension extending coaxially through said sleeve portion, said coupling including a generally radial shoulder that defines the maximum extent of the counterbore, said coupling including an annular recess extending from said shoulder toward the nipple portion, said recess being filled with elastomeric material that is adhered to the surfaces defining the recess and to the radially innermost tube of said hose;
   (c) said plies of reinforcing elements extending into the sleeve portion and not beyond said shoulder and being embedded in an anchoring matrix material disposed within the sleeve portion of the coupling that anchors the reinforcing elements to the sleeve portion of the coupling.

2. The combination of claim 1, wherein the elastomeric material of the hose tube extends beyond said plies of reinforcing elements.

3. The combination of claim 1, wherein said recess is defined in major part by a radially innermost conical surface one end of which extends to the bore of the nipple and a radially outermost annular surface one end of which extends to the counterbore of the sleeve, the included angle between generator lines which define the radially innermost and outermost surfaces when viewed in an axial cross section of the coupling being from about 20 to 60 degrees.

4. The combination of claim 1, wherein said recess when viewed in a quarter section taken axially of the coupling has a configuration resembling half of an elipse with the major axis extending in the axial direction.

5. The combination of claim 1, wherein said recess when viewed in a quarter section taken axially of the coupling has a U-shaped configuration.

6. The combination of claim 1, wherein the counterbore includes a coarse flat bottom thread cut therein to assist retention of the coupling to the anchoring matrix material.

7. The combination of claim 1, 2, 3, 4, 5 or 6 wherein the cover layer of said hose extends at least partly over the sleeve portion of the coupling and is adhered thereto.

8. The coupling of claim 1 wherein the coupling is unitary and formed of metal.

9. The combination of claim 1, wherein the counterbore of the coupling includes a coarsely textured wall to assist retention of the coupling to the hose.

10. The combination of claim 1, wherein the counterbore of the coupling includes a plurality of areas of lesser diameter in alternating sequence with a plurality of areas of greater diameter to assist retention of the coupling to the hose.

* * * * *

UNITED STATES PATENT AND TRADEMARK OFFICE
CERTIFICATE OF CORRECTION

PATENT NO.  : 4,353,581
DATED       : October 12, 1982
INVENTOR(S) : George W. Eisenzimmer It is certified that error appears in the above-identified patent and that said Letters Patent is hereby corrected as shown below:

Column 3, line 32, delete "if" and replace therewith --is--.

Column 4, line 59, delete "formedof" and replace therewith --formed of--.

Signed and Sealed this

Twentieth  Day of  August 1985

[SEAL]

Attest:

DONALD J. QUIGG

Attesting Officer        Acting Commissioner of Patents and Trademarks